# (12) United States Patent
Mitsumoto et al.

(10) Patent No.: US 10,263,244 B2
(45) Date of Patent: Apr. 16, 2019

(54) LITHIUM METAL COMPOSITE OXIDE HAVING LAYERED STRUCTURE

(71) Applicant: Mitsui Mining & Smelting Co., Ltd., Tokyo (JP)

(72) Inventors: Tetsuya Mitsumoto, Takehara (JP); Yasuhiro Ochi, Takehara (JP); Tomohiro Sakata, Takehara (JP); Hitohiko Ide, Takehara (JP); Yoshimi Hata, Takehara (JP); Shinya Kagei, Takehara (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 0 days.

(21) Appl. No.: 14/359,346

(22) PCT Filed: Nov. 26, 2012

(86) PCT No.: PCT/JP2012/080445
§ 371 (c)(1),
(2) Date: May 20, 2014

(87) PCT Pub. No.: WO2013/077441
PCT Pub. Date: May 30, 2013

(65) Prior Publication Data
US 2014/0329147 A1 Nov. 6, 2014

(30) Foreign Application Priority Data

Nov. 25, 2011 (JP) ................. 2011-257193

(51) Int. Cl.
*H01M 4/131* (2010.01)
*H01M 4/525* (2010.01)
*H01M 4/505* (2010.01)
*H01M 10/052* (2010.01)
*C01G 53/00* (2006.01)
*H01M 4/02* (2006.01)

(52) U.S. Cl.
CPC ............ *H01M 4/131* (2013.01); *C01G 53/50* (2013.01); *H01M 4/505* (2013.01); *H01M 4/525* (2013.01); *H01M 10/052* (2013.01); *C01P 2002/72* (2013.01); *C01P 2004/03* (2013.01); *C01P 2004/61* (2013.01); *C01P 2006/12* (2013.01); *C01P 2006/80* (2013.01); *H01M 2004/028* (2013.01); *H01M 2220/20* (2013.01)

(58) Field of Classification Search
CPC .. C01G 53/50; C01P 2002/72; C01P 2004/03; C01P 2004/61; C01P 2006/12; C01P 2006/80; H01M 10/052; H01M 2004/028; H01M 2220/20; H01M 4/131; H01M 4/505; H01M 4/525; Y02E 60/122
See application file for complete search history.

(56) References Cited

U.S. PATENT DOCUMENTS

| | | | | |
|---|---|---|---|---|
| 2001/0010807 A1* | 8/2001 | Matsubara | ............ | H01M 4/525 423/277 |
| 2006/0147796 A1* | 7/2006 | Miura | ................. | H01M 4/0404 429/209 |
| 2009/0104530 A1* | 4/2009 | Shizuka | ................. | H01M 4/505 429/223 |

FOREIGN PATENT DOCUMENTS

| | | |
|---|---|---|
| JP | 08-171910 | 7/1996 |
| JP | 10-001316 | 1/1998 |
| JP | 2003-017052 | 1/2003 |
| JP | 2003-034536 | 2/2003 |
| JP | 2004-253169 | 9/2004 |
| JP | 2004-355824 | 12/2004 |
| JP | 2007-095571 | 4/2007 |
| JP | 4213768 | 1/2009 |
| JP | 2010-064944 | 3/2010 |
| JP | 2011-113885 | 6/2011 |
| WO | 2008/091028 | 7/2008 |

* cited by examiner

Primary Examiner — Osei K Amponsah
(74) Attorney, Agent, or Firm — The Webb Law Firm

(57) ABSTRACT

Provided is a lithium metal composite oxide having a layered structure, which is particularly excellent as a positive electrode active material for batteries that are mounted on electric vehicles or hybrid vehicles. Proposed is a lithium metal composite oxide having a layered structure, which is represented by general formula $Li_{1+X}(Mn_\alpha Co_\beta Ni_\gamma)_{1-X}O_2$ ($0.00 \leq X \leq 0.07$, $0.10 \leq \alpha \leq 0.40$, $0.10 \leq \beta \leq 0.40$, and $0.30 \leq \gamma \leq 0.75$) and has a specific surface area of more than 2.0 m$^2$/g but 5.0 m$^2$/g or less and has an average particle size of the primary particles/crystallite size ratio of 5.7 to 18.5.

3 Claims, No Drawings

LITHIUM METAL COMPOSITE OXIDE HAVING LAYERED STRUCTURE

CROSS-REFERENCE TO RELATED APPLICATIONS

This application is the United States national phase of International Application No. PCT/JP2012/080445 filed Nov. 26, 2012, and claims priority to Japanese Patent Application No. 2011-257193 filed Nov. 25 2011, the disclosures of which are hereby incorporated in their entirety by reference.

TECHNICAL FIELD

The present invention relates to a lithium metal composite oxide having a layered structure which can be used as a positive electrode active material of a lithium battery, and particularly, to a lithium metal composite oxide which is capable of exhibiting excellent performance as a positive electrode active material of a battery that is mounted on an electric vehicle (EV) or a hybrid electric vehicle (HEV).

BACKGROUND ART

A lithium battery, particularly, a lithium secondary battery has characteristics such as a large energy density and a long life and have been used as a power supply of home electric appliances such as a video camera, and a portable electronic apparatus such as a notebook personal computer and a cellular phone. Recently, the lithium secondary battery has been applied to a large-sized battery that is mounted on the electric vehicle (EV), the hybrid electric vehicle (HEV), and the like.

The lithium secondary battery is a secondary battery having the following configuration. During charge, lithium is eluted as ions from a positive electrode, moves to a negative electrode, and is stored in the negative electrode. Conversely, during discharge, the lithium ions return to the positive electrode from the negative electrode. It is known that the high energy density of the lithium secondary battery is caused by an electric potential of a positive electrode material.

As a positive electrode active material of the lithium secondary battery, in addition to lithium-manganese oxide ($LiMn_2O_4$) having a spinel structure, lithium metal composite oxides such as $LiCoO_2$, $LiNiO_2$, and $LiMnO_2$ which have a layered structure are known. For example, $LiCoO_2$ has a layered structure in which a lithium atom layer and a cobalt atom layer are alternately overlapped with an oxygen atom layer interposed therebetween, and has large charge and discharge capacity and excellent diffusibility in storage and release of lithium ions. Accordingly, the majority of commercially available lithium secondary batteries use a lithium metal composite oxide such as $LiCoO_2$ having a layered structure.

The lithium metal composite oxide such as $LiCoO_2$ and $LiNiO_2$ which have a layered structure is expressed by General Formula of $LiMeO_2$ (Me represents a transition metal), and a crystal structure thereof belongs to a space group R-3m ("-" is commonly attached to an upper portion of "3" and represents a rotary inversion. The same shall apply hereafter), and a Li ion, a Me ion, and an oxide ion occupy a 3a site, a 3b site, and a 6c site, respectively. In addition, it is known that the lithium metal composite oxide shows a layered structure in which a layer (Li layer) composed of Li ions and a layer (Me layer) composed of Me ions are alternately overlapped with an O layer composed of oxide ions interposed therebetween.

In the related art, with regard to the lithium metal composite oxide ($LiM_xO_2$) having a layered structure, for example, Patent Document 1 discloses an active material expressed by Formula of $LiNi_xMn_{1-x}O_2$ (in Formula, $0.7 \leq x \leq 0.95$) which is obtained by adding an alkali solution to a mixed aqueous solution of manganese and nickel to coprecipitate manganese and nickel, by adding lithium hydroxide to the mixed aqueous solution, and by baking the resultant mixture.

Patent Document 2 discloses a positive electrode active material which is formed from crystal particles of oxides containing three kinds of transition metals, in which a crystal structure of the crystal particles is a layered structure and arrangement of oxygen atoms constituting the oxides is cubic closest packing, and which is expressed by $Li[Li_x(A_PB_QC_R)_{1-x}]O_2$ (in Formula, A, B, and C represent three kinds of transition metal elements different from each other, $-0.1 \leq x \leq 0.3$, $0.2 \leq P \leq 0.4$, $0.2 \leq Q \leq 0.4$, and $0.2 \leq R \leq 0.4$).

Patent Document 3 discloses a method of manufacturing a layered lithium-nickel-manganese composite oxide powder to provide a layered lithium-nickel-manganese composite oxide powder having a high bulk density. The method includes drying slurry, which contains at least a lithium source compound, a nickel source compound, and a manganese source compound that are pulverized and mixed in a range of 0.7 to 9.0 in terms of a molar ratio [Ni/Mn] between a nickel atom [Ni] and a manganese atom [Mn], by spray drying, baking the resultant compound obtained by drying the slurry to form a layered lithium-nickel-manganese composite oxide powder, and pulverizing the composite oxide powder.

Patent Document 4 discloses a material which contains a lithium transition metal composite oxide obtained by mixing-in vanadium (V) and/or boron (B) to make a crystallite size large, that is, a lithium transition metal composite oxide expressed by General Formula of $Li_xM_yO_{Z-\delta}$ (in Formula, M represents Co or Ni that is a transition metal element, and a relation of $(X/Y)=0.98$ to $1.02$ and a relation of $(\delta/Z) \leq 0.03$ are satisfied), and contains vanadium (V) and/or boron (B) in a ratio of $((V+B)/M)=0.001$ to $0.05$ (molar ratio) with respect to the transition metal element (M) that constitutes the lithium transition metal composite oxide. In the material, a primary particle size is 1 μm or more, a crystallite size is 450 Å or more, and a lattice strain is 0.05% or less.

An object of Patent Document 5 is to provide a positive electrode active material for a nonaqueous secondary battery which is formed from primary particles and which retains a high bulk density and battery characteristics without occurrence of cracking, and Patent Document 5 suggests a positive electrode active material for a nonaqueous secondary battery which is a powdered lithium composite oxide of monodispersed primary particles containing one kind of element selected from a group consisting of Co, Ni, and Mn, and lithium as a main component, and in which an average particle size (D50) is 3 μm to 12 μm, a specific surface area is 0.2 m²/g to 1.0 m²/g, a bulk density is 2.1 g/cm³ or more, and an inflection point of a volume reduction rate according to a Copper Plot method does not appear before 3 ton/cm².

Patent Document 6 suggests a lithium metal composite oxide having a layered structure in which a ratio of a crystallite size to the average powder particle size (D50) is 0.05 to 0.20. The average powder particle size (D50) is obtained by a laser diffraction and scattering type particle size distribution measurement method.

CITATION LIST

Patent Document

Patent Document 1: JP H8-171910
Patent Document 2: JP 2003-17052
Patent Document 3: JP 2003-34536
Patent Document 4: JP 2004-253169
Patent Document 5: JP 2004-355824
Patent Document 6: Patent Publication No. 4213768 (WO2008/091028)

An in-vehicle battery is charged and discharged under various kinds of temperature environments from a low-temperature environment during winter to a high-temperature environment during summer, and thus excellent weather resistance is demanded for a positive electrode material that is used in the in-vehicle battery.

In the lithium metal composite oxide having a layered structure, when being exposed to a high temperature, an interlayer bonding distance becomes loose, and thus entrance and exit of Li ions easily occur. Accordingly, capacity (discharge capacity) in a positive electrode tends to increase. In contrast, capacity of a negative electrode is constant, and thus a capacity balance between the positive electrode and the negative electrode collapses. Therefore, when charge and discharge are repeated in this state, in a battery that uses the lithium metal composite oxide having the layered structure as the positive electrode, there is a problem in that deterioration progresses. Particularly, in the case of the in-vehicle battery, a plurality of small batteries (unit cell) are mounted in series, and thus the increase in discharge capacity of the positive electrode under a high-temperature environment has a great effect on lifetime of the battery.

SUMMARY OF THE INVENTION

An object of the invention is to provide a lithium metal composite oxide having a new layered structure which has an excellent weather resistance and which is particularly capable of suppressing an increase in discharge capacity at a high temperature in a case of using a lithium metal composite oxide having a layered structure for a positive electrode of a battery.

According to an embodiment of the invention, there is provided a lithium metal composite oxide having a layered structure, which is expressed by General Formula of $Li_{1+x}(Mn_\alpha Co_\beta Ni_\gamma)_{1-x}O_2$ (0.00≤X≤0.07, 0.10≤α≤0.40, 0.10≤β≤0.40, and 0.30≤γ≤0.75).

A specific surface area is more than 2.0 $m^2/g$ and equal to or less than 5.0 $m^2/g$.

A ratio (referred to as "average particle size of primary particles/crystallite size) of the average particle size of the primary particles, which is obtained by the following measurement method, to the crystallite size which is obtained by the following measurement method is 5.7 to 18.5.

(Method of Measuring Crystallite Size)

In the method of measuring the crystallite size, the crystallite size of a measurement sample (powder) is measured by using an X-ray diffraction device using Cu-kα rays, at this time, analysis is performed by employing a fundamental parameter, and the crystallite size is calculated by using analysis software on the basis of an X-ray diffraction pattern obtained from a diffraction angle (2θ) range of 15° to 120°.

(Method of Measuring Average Particle Size of Primary Particles)

In the method of measuring the average particle size of the primary particles, the average particle size of the primary particles is observed by using a scanning electron microscope at an acceleration voltage of 20 kV and a magnification of 5000 times, and an image of the primary particles in an electron microscope photograph is analyzed using image analysis software to calculate the average particle size of the primary particles.

With regard to the lithium metal composite oxide having a layered structure, which is expressed by General Formula of $Li_{1+x}(Mn_\alpha Co_\beta Ni_\gamma)_{1-x}O_2$ (0.00≤X≤0.07, 0.10≤α≤0.40, 0.10≤β≤0.40, and 0.30≤γ≤0.75), when the ratio of the average particle size of the primary particles to the crystallite size is 5.7 to 18.5, in a case of using the lithium metal composite oxide in a battery as a positive electrode active material, it can be seen that an increase in discharge capacity of the battery at a high temperature can be suppressed, and a discharge capacity retention rate, for example, at 60° C. is improved. In addition, when the specific surface area of the lithium metal composite oxide is to be more than 2.0 $m^2/g$ and equal to or less than 5.0 $m^2/g$, it can be seen that a decrease in output characteristics of the battery can be suppressed.

Accordingly, when being used in a positive electrode of a battery, the lithium metal composite oxide having the layered structure according to the invention can be preferably used under various temperature environments. Accordingly, the lithium metal composite oxide is particularly excellent as a positive electrode active material of an in-vehicle battery for which particularly excellent weather resistance is demanded, particularly, a battery that is mounted on an electric vehicle (EV) or a hybrid electric vehicle (HEV).

DETAILED DESCRIPTION OF THE INVENTION

Hereinafter, an embodiment of the invention will be described, but the invention is not limited to the following embodiment.

<Present Lithium Metal Composite Oxide>

A lithium metal composite oxide of this embodiment (hereinafter, referred to as a present lithium metal composite oxide) is a powder containing lithium metal composite oxide particles having a layered structure which is expressed by General Formula (1): $Li_{1+x}(Mn_\alpha Co_\beta Ni_\gamma)_{1-x}O_2$ as a main component. That is, the lithium metal composite oxide is a powder containing lithium metal composite oxide particles, which have a layered structure in which a lithium atom layer and a transition metal atom layer are alternately overlapped with an oxygen atom layer being interposed therebetween, as a main component.

In addition, "containing something as a main component" includes a configuration containing other components in a range not hindering a function of the main component unless otherwise stated. A contained ratio of the main component is not specified, but includes a case of occupying at least 50% by mass or more of the powder, preferably 70% by mass or more, more preferably 90% by mass or more, and still more preferably 95% by mass or more (including 100%).

For example, the present lithium metal composite oxide may contain 1.0% by weight or less of $SO_4$, and 0.5% by weight or less of other elements as impurities. This is because the characteristics of the present lithium metal composite oxide are hardly affected by impurities in such an amount.

In Formula (1), "1+x" is preferably 1.00 to 1.07, more preferably 1.01 or more, and still more preferably 1.02 or more.

In Formula (1), a value of α is preferably 0.10 to 0.40, more preferably 0.18 to 0.35, and still more preferably 0.31 or less.

A value of β is preferably 0.10 to 0.40, more preferably 0.18 to 0.35, and still more preferably 0.31 or less.

A value of γ is preferably 0.30 to 0.75, more preferably 0.31 to 0.59, and still more preferably 0.36 or more.

On the other hand, in Formula (1), an atomic ratio of the oxygen content is described as "2" for convenience, but may have slight non-stoichiometry.

(Average Particle Size of Primary Particles/Crystallite Size)

In the present lithium metal composite oxide, a ratio (referred to as "average particle size of primary particles/ crystallite size) of the average particle size of the primary particles, which is obtained by the above-described measurement method, to the crystallite size which is obtained by the above-described measurement method is preferably 5.7 to 18.5, more preferably 6.0 to 15.0, and still more preferably 6.0 to 13.0.

With regard to the lithium metal composite oxide, which has the layered structure, of the above-described composition, when the average particle size of primary particles/ crystallite size is 5.7 to 18.5, in a case of using the lithium metal composite oxide as a positive electrode active material, an increase in discharge capacity at a high temperature can be suppressed, and a deterioration of a discharge capacity retention rate, for example, at 60° C. can be suppressed.

The ratio of the average particle size of the primary particles to the crystallite size is a value that is approximately proportional to the number of crystallites present in the primary particles. Accordingly, when the ratio of the primary particle size to the crystallite size is large, a lot of crystallites are present in the primary particles, and thus a lot of partition walls are present in the primary particles. Accordingly, when the ratio of the primary particle size to the crystallite size is large, expansion and contraction of particles due to a variation in a temperature is suppressed, and thus it is considered that an increase in discharge capacity at a high temperature can be suppressed.

On the other hand, "crystallite" in the present invention represents the maximum assembly that may be regarded as a single crystal, and can be obtained by carrying out XRD measurement and Rietveld analysis.

A particle of the smallest unit which is constituted by a plurality of crystallites and which is surrounded by a grain boundary when being observed by a SEM (for example, at a magnification of 5000 times) is referred to as "primary particle" in the invention. Accordingly, a single crystal and a polycrystal are included in the primary particles.

In addition, a particle in which a plurality of primary particles are agglomerated to share a part of the periphery (grain boundary) thereof, and which is isolated from other particles is referred to as "secondary particle" or "agglomerated particle" in the invention.

In addition, the laser diffraction and scattering type particle size distribution measurement method is a measurement method of calculating a particle size by regarding agglomerated particles as one particle (agglomerated particle). D50 according to the measurement method represents 50% volume accumulated particle size, that is, a diameter of accumulated 50% from details of percentage expression about a measured value of a particle size in terms of volume in a volumetric basis particle size distribution chart.

(Average Particle Size of Primary Particles)

The average particle size of the primary particles of the present lithium metal composite oxide powder is not particularly limited as long as the average particle size of primary particles/crystallite size is in the above-described range. As a reference, 0.05 µm to 5.0 µm is preferable, 0.1 µm to 40 µm is more preferable, and 0.3 µm to 3.0 µm is still more preferable.

The average particle size of the primary particles of the present lithium metal composite oxide powder may be adjusted by selection of a raw material crystalline state, baking conditions, and the like.

(Crystallite Size)

The crystallite size of the present lithium metal composite oxide powder is not particularly limited as long as the average particle size of primary particles/crystallite size is in the above-described range. As a reference of the crystallite size of the lithium metal composite oxide powder is preferably 1 nm to 100 nm, more preferably 5 nm to 100 nm, and still more preferably 5 nm to 90 nm.

For example, the crystallite size of the present lithium metal composite oxide may be adjusted according to a composition ratio of a transition metal (composition ratio such as a ratio of Mn:Co:Ni and a ratio of Li:Mn), a raw material particle size, baking conditions, and the like.

(D50 after Pressing/Crystallite Size)

With regard to the present lithium metal composite oxide, a ratio of (referred to as "D50 after pressing/crystallite size") of D50 after pressing which is obtained by the following measurement method to a crystallite size which is obtained by the above-described measurement method is preferably 10 to 500, more preferably 10 to 300, still more preferably 25 or more, and still more preferably 50 or more.

With regard to the lithium metal composite oxide, which has the layered structure, of the above-described composition, when the D50 after pressing/crystallite size is 10 to 500, in a case of using the lithium metal composite oxide as a positive electrode active material, an increase in discharge capacity at a high temperature can be suppressed, and a deterioration of a discharge capacity retention rate, for example, at 60° C. can be suppressed, and thus this range is relatively preferable. Particularly, when D50 after pressing/ crystallite size is 50 to 500, a deterioration of an output retention rate, for example, at 60° C. may be suppressed, and thus this range is more preferable.

The ratio of D50 after pressing to the crystallite size is a value that is approximately proportional to the number of crystallites present in secondary particles. Accordingly, when the ratio of D50 after pressing to the crystallite size is large, a lot of crystallites are present in the secondary particles, and thus a lot of partition walls are present in the secondary particles. Accordingly, when the ratio of D50 after pressing to the crystallite size is large, expansion and contraction of particles due to a variation in a temperature is suppressed, and thus it is considered that an increase in discharge capacity at a high temperature can be suppressed.

On the other hand, with regard to measurement of D50 after pressing, NMP is added to the present lithium metal composite oxide to obtain a paste and this paste is dried. The resultant dried sample is compressed at a pressure of 32 MPa by using a pressing machine, and D50 of the sample (powder) is measured by using a laser diffraction and scattering type particle size distribution measuring device (for example, mold-type HRA 9320-X100 manufactured by Nikkiso Co., Ltd.)

(D50 after Pressing)

D50 after pressing of the present lithium metal composite oxide powder is preferably adjusted in such a manner that D50 after pressing/crystallite size falls into the above-described range. D50 after pressing is more preferably 1.0 μm to 20.0 μm, still more preferably 1.5 μm to 15.0 μm, and still more preferably 2.0 μm to 10.0 μm.

When D50 after pressing of the present lithium metal composite oxide powder is 3.0 μm to 20.0 μm, handling is easy from the viewpoint of flowability during manufacturing of the electrode, and thus the range is preferable.

D50 after pressing of the present lithium metal composite oxide powder can be adjusted according to a raw material particle size, baking conditions, and the like.

On the other hand, in the present lithium metal composite oxide powder, the reason why D50 after pressing is defined is that when practically being used as a positive electrode active material of a lithium battery in an electric vehicle, a hybrid vehicle, and the like, the present lithium metal composite oxide powder is used in a state in which a pressure is applied.

In addition, in the method of measuring D50 after pressing, compression at a compression density in a range of 2.4 g/cm$^3$ to 3.0 g/cm$^3$ is defined. The reason of this definition is that the compression density is difficult to accurately define, but when the compression density deviates in a range of 2.4 g/cm$^3$ to 3.0 g/cm$^3$, this deviation does not have an effect on the value of D50 after pressing.

(Specific Surface Area)

A specific surface area of the present lithium metal composite oxide powder is preferably more than 2.0 m$^2$/g and equal to or less than 5.0 m$^2$/g, and more preferably 2.0 m$^2$/g to 4.0 m$^2$/g.

When the specific surface area is in a range more than 2.0 m$^2$/g and equal to or less than 5.0 m$^2$/g, a decrease in output characteristic due to too small specific surface area does not occur, and exhaustion of an electrolytic solution and deterioration in cycle characteristics due to too high specific surface area also does not occur, which is preferable.

The specific surface area can be measured by a known BET specific surface area measuring method which uses a nitrogen adsorption method.

The specific surface area of the present lithium metal composite oxide powder can be adjusted according to baking conditions, pulverization conditions, and the like.

(Manufacturing Method)

Next, a method of manufacturing the present lithium metal composite oxide powder will be described.

The present lithium metal composite oxide powder may be obtained as follows. Raw materials such as a lithium salt compound, a manganese salt compound, a nickel salt compound, and a cobalt salt compound are mixed with each other. The resultant mixture is pulverized using a wet type pulverizer and the like, and the resultant pulverized mixture is granulated and dried using a thermal spraying dryer. Then, baking is carried out, and a heat treatment may be carried out as necessary. Then, classification may be carried out as necessary.

At this time, to manufacture the present lithium metal composite oxide powder, it is preferable to adjust a ratio (also referred to as "Li/metal ratio") of Li to a total amount of Mn, Co, and Ni in a raw material composition in a desired range, to adjust a baking temperature and a baking atmosphere in desired ranges, and to adjust various manufacturing conditions.

To manufacture the lithium metal composite oxide powder, first, it is preferable to weigh and mix the lithium salt compound, the manganese salt compound, the nickel salt compound, and the cobalt salt compound in such a manner that the ratio (also referred to as "Li/metal ratio") of Li to a total amount of Mn, Co, and Ni becomes 1.01 to 1.15.

Examples of the lithium salt compound include lithium hydroxide (LiOH), lithium carbonate ($Li_2CO_3$), lithium nitrate ($LiNO_3$), $LiOH \cdot H_2O$, lithium oxide ($Li_2O$), fatty acid lithium, lithium halide, and the like. Among these, lithium hydroxide, lithium carbonate, and lithium nitrate are preferable.

A kind of the manganese salt compound is not particularly limited. For example, manganese carbonate, manganese nitrate, manganese chloride, manganese dioxide, and the like may be used. Among these, manganese carbonate and manganese dioxide are preferable, and electrolytic manganese dioxide that is obtained according to an electrolytic method is still more preferable.

A kind of the nickel salt compound is also not particularly limited. For example, nickel carbonate, nickel nitrate, nickel chloride, nickel oxyhydroxide, nickel hydroxide, nickel oxide, and the like may be used. Among these, nickel carbonate, nickel hydroxide, and nickel oxide are preferable.

A kind of the cobalt salt compound is also not particularly limited. For example, basic cobalt carbonate, cobalt nitrate, cobalt chloride, cobalt oxyhydroxide, cobalt hydroxide, cobalt oxide, and the like may be used. Among these, basic cobalt carbonate, cobalt hydroxide, cobalt oxide, and cobalt oxyhydroxide are preferable.

With regard to mixing of the raw materials, it is preferable to carry out wet-type mixing by adding a liquid medium such as water and a dispersant so as to obtain slurry, and it is preferable to pulverize the obtained slurry using a wet-type pulverizer. However, dry-type pulverization may also be carried out.

As a granulation method, a wet type or a dry type is possible as long as various kinds of raw materials that are pulverized in a previous process are dispersed in granulated particles without being separated. In addition, the granulation method may be an extrusion granulation method, a rolling granulation method, a fluidized bed granulation method, a mixing granulation method, a spray dry granulation method, a compression molding granulation method, or a flake granulation method using roll or the like. However, in the case of carrying the wet-type granulation, it is necessary to sufficiently carry out drying before baking. Examples of a drying method include various known dry methods in the related art such as a spray thermal dry method, a hot-air dry method, a vacuum dry method, and a freeze-dry method. Among these, the spray thermal dry method is preferable. The spray thermal dry method is preferably carried out using a thermal spray dryer (spray dryer).

However, it is possible to manufacture a granulated powder, which is provided for baking, according to, for example, a so-called coprecipitation method.

It is preferable to carry out the baking in a baking furnace under an atmospheric atmosphere, an oxygen gas atmosphere, an atmosphere in which an oxygen partial pressure is adjusted, a carbon dioxide gas atmosphere, or other atmospheres at a temperature higher than 780° C. and lower than 850° C. (represents a temperature in a case of bringing a thermocouple into contact with a baked product inside a baking furnace), and preferably 780° C. to 820° C. for a retention time of 0.5 hours to 30 hours. At this time, it is preferable to select baking conditions in which a transition metal is present as a solid solution in an atomic level, and a single phase is exhibited.

A kind of the baking furnace is not particularly limited. For example, the baking may be carried out using a rotary kiln, a stationary furnace, and other baking furnaces.

It is preferable to carry out a heat treatment after the baking in a case where adjustment of a crystal structure is necessary, and the heat treatment may be carried out under oxidizing atmosphere conditions such as an atmospheric atmosphere, an oxygen gas atmosphere, and an atmosphere in which an oxygen partial pressure is adjusted. It should be noted, the heat treatment may be carried out as necessary.

Crushing may be performed after the baking or the heat treatment. At this time, the crushing may be performed by employing a typical crushing method, but it is preferable to carry out the crushing using a high speed rotary pulverizer and the like. When the crushing is carried out using the high speed rotary pulverizer, it is possible to crush a portion in which particles are agglomerated, or sintering is weak. In addition, it is possible to suppress occurrence of strain in particles. However, it is not limited to the high speed rotary pulverizer.

Examples of the high speed rotary pulverizer include a pin mill. The pin mill is known as a disk rotary type pulverizer, and is a crusher of the following type. A rotary disk to which a pin is attached rotates, whereby the inside is set to a negative pressure, and thus a powder is sucked in from a raw material supply port. Accordingly, fine particles have a light weight, and thus the fine particles tend to ride an air current and pass through a clearance in the pin mill. On the other hand, coarse particles are reliably crushed. As a result, according to the pin mill, it is possible to reliably loosen agglomeration between particles or a weakly sintered portion, and it is possible to prevent a strain from being introduced into the inside of the particles.

It is preferable that the number of revolutions of the high speed rotary pulverizer be set to 4000 rpm or more, more preferably 5000 rpm to 12000 rpm, and still more preferably 7000 rpm to 10000 rpm.

The classification after the baking has a technical meaning for adjustment of a particle size distribution of agglomerated powders and removal of foreign substances, and thus it is preferable to carry out the classification in order for 90% accumulated diameter (D90) on the basis of a volume to be 10 μm to 50 μm.

In addition, pulverization may be performed after the classification as necessary. The pulverization at this time may be performed by using a classification mechanism-equipped collision type pulverizer, for example, a classifying rotor-equipped counter jet mill, and the like in order for the ratio of the average particle size (D50) and the crystallite size to be in a predetermined range. Typically, powder particles obtained by performing pulverization using the classification mechanism-equipped collision type pulverizer has a non-spherical shape.

(Characteristic and Use)

The present lithium metal composite oxide powder can be effectively used as a positive electrode active material of a lithium battery after being crushed and classified as necessary.

For example, the present lithium metal composite oxide powder, an electrically conductive material formed from carbon black and the like, and a binder including a Teflon (Teflon is a registered trademark of DUPONT in USA) binder and the like are mixed-in to prepare a positive electrode mixture. In addition, the lithium secondary battery may be configured in such a manner that the positive electrode mixture is used for a positive electrode, for example, a material such as lithium and carbon capable of intercalating and deintercalating lithium is used for a negative electrode, and a material obtained by dissolving a lithium salt such as lithium hexafluorophosphate (LiPF$_6$) in a mixed solvent such as ethylene carbonate-dimethyl carbonate is used as a nonaqueous electrolyte. However, it is not limited to the battery having the configuration.

The lithium battery provided with the lithium metal composite oxide powder as a positive electrode active material exhibits excellent lifetime characteristics (cycle characteristics) and output characteristics when being used by repeating charge and discharge at the central region of charge and discharge depth (for example, SOC 50%-80%). Accordingly, the lithium battery is particularly excellent for a use of a positive electrode active material of a lithium battery that is used as a power supply for driving a motor mounted on, particularly, an electric vehicle (EV) or a hybrid electric vehicle (HEV).

In addition, the "hybrid vehicle" represents a vehicle using two power sources including an electric motor and a combustion engine in combination.

In addition, the "lithium battery" represents all kinds of batteries such as a lithium primary battery, a lithium secondary battery, a lithium ion secondary battery, and a lithium polymer battery which contain lithium or lithium ions in a battery.

<Description of Phrase>

In this specification, in the case of expressing "X to Y" (X and Y represent an arbitrary number), this expression also includes meaning of "preferably more than X" or "preferably less than Y" together with meaning of "equal to or more than X and equal to or less than Y" unless otherwise stated.

In addition, in the case of expressing "X or more" (X represents an arbitrary number) or "Y or less" (Y represents an arbitrary number), this expression also includes intension of "preferably more than X" or "preferably less than Y".

EXAMPLES

Next, the invention will be further described on the basis of Examples and Comparative Examples, but the invention is not limited to the following Examples.

Example 1

As a dispersant, ammonium polycarboxylate (SN dispersant 5468, manufactured by SAN NOPCO LIMITED) was added to ion exchanged water in such a manner that the dispersant to a solid concentration of raw materials in slurry became 5% by weight, and the ammonium polycarboxylate was sufficiently dissolved and mixed in the ion exchanged water.

Lithium carbonate having average particle size (D50) of 8 μm, electrolytic manganese dioxide having the average particle size (D50) of 22 μm and a specific surface area of 40 m$^2$/g, nickel hydroxide having the average particle size (D50) of 25 μm, and cobalt oxyhydroxide having the average particle size (D50) of 14 μm were weighed in a molar ratio of Li:Mn:Ni:Co=1.03:0.26:0.52:0.19, and the above-described metal salts were mixed and stirred in this order in the above-described ion exchanged water, in which the dispersant was dissolved in advance, to prepare slurry having a solid content concentration of 10% by weight. Next, the slurry was stirred by an impeller for 1 hour or more, and pulverizing was performed by using a wet-type pulverizer at 300 rpm for 30 minutes to set the average particle size (D50) of the mixed raw materials in the slurry to 0.5 μm, thereby obtaining a pulverized slurry.

The pulverized slurry that was obtained was granulated and dried using a thermal spray dryer (spray dryer i-8, manufactured by OHKAWARA KAKOHKI CO., LTD.), thereby obtaining a granulated powder. At this time, a rotary disk was used for spraying. The granulation and drying were carried out under conditions in which the number of revolutions was set to 30000 rpm, a slurry supply amount was set to 3 kg/hr, and a temperature was adjusted in such a manner that an outlet temperature of a drying column became 100° C.

A granulated powder that was obtained was baked using a stationary electric furnace for 20 hours in the air at 800° C.

A baked powder that was obtained by the baking was classified by using a sieve with an aperture of 75 μm, thereby obtaining a lithium metal composite oxide powder (sample). Chemical analysis was performed with respect to the sample, and as a result thereof, a lithium transition metal oxide powder (sample) of $Li_{1.01}Ni_{0.523}Mn_{0.268}Co_{0.200}O_2$ was found.

Example 2

As a dispersant, ammonium polycarboxylate (SN dispersant 5468, manufactured by SAN NOPCO LIMITED) was added to ion exchanged water in such a manner that the dispersant to a solid concentration of raw materials in slurry became 6% by weight, and the ammonium polycarboxylate was sufficiently dissolved and mixed in the ion exchanged water.

Lithium carbonate having D50 of 7 μm, electrolytic manganese dioxide having D50 of 23 μm and a specific surface area of 40 m$^2$/g, cobalt oxyhydroxide having D50 of 14 μm, and nickel hydroxide having D50 of 22 μm were weighed in a molar ratio of Li:Mn:Ni:Co=1.04:0.26:0.51:0.19, and the above-described metal salts were mixed and stirred in this order in the above-described ion exchanged water, in which the dispersant was dissolved in advance, to prepare slurry having a solid content concentration of 50% by weight. Next, the slurry was stirred by a media stirring type pulverizer at 1300 rpm for 40 minutes to set the average particle size (D50) of the mixed raw materials in the slurry to 0.5 μm, thereby obtaining a pulverized slurry.

The pulverized slurry that was obtained was granulated and dried using a thermal spray dryer (spray dryer OC-16, manufactured by OHKAWARA KAKOHKI CO., LTD.), thereby obtaining a granulated powder. At this time, a rotary disk was used for spraying. The granulation and drying were carried out under conditions in which the number of revolutions was set to 24000 rpm, a slurry supply amount was set to 3 kg/hr, and a temperature was adjusted in such a manner that an outlet temperature of a drying column became 100° C.

A granulated powder that was obtained was calcinated using a stationary electric furnace in the air at 700° C. Continuously, a resultant calcinated powder was baked using a stationary electric furnace at 800° C. for 20 hours.

A baked aggregation that was obtained by the baking was put into a mortar and it was crushed with a pestle, and the resultant crushed sample was classified by using a sieve with an aperture of 53 μm to collect a sieved composite metal oxide powder (sample).

Chemical analysis was performed with respect to the collected lithium transition metal oxide powder (sample), and as a result thereof, a composition of $Li_{1.04}Ni_{0.52}Cu_{0.19}Mn_{0.25}O_2$ was found.

Example 3

As a dispersant, ammonium polycarboxylate (SN dispersant 5468, manufactured by SAN NOPCO LIMITED) was added to ion exchanged water in such a manner that the dispersant to a solid concentration of raw materials in slurry became 6% by weight, and the ammonium polycarboxylate was sufficiently dissolved and mixed in the ion exchanged water.

Lithium carbonate having D50 of 7 μm, electrolytic manganese dioxide having D50 of 23 μm and a specific surface area of 40 m$^2$/g, cobalt oxyhydroxide having D50 of 14 μm, and nickel hydroxide having D50 of 22 μm were weighed in a molar ratio of Li:Mn:Ni:Co=1.04:0.26:0.51:0.19, and the above-described metal salts were mixed and stirred in this order in the above-described ion exchanged water, in which the dispersant was dissolved in advance, to prepare slurry having a solid content concentration of 50% by weight. Next, the slurry was pulverized by a media stirring type pulverizer at 1300 rpm for 40 minutes to set the average particle size (D50) of the mixed raw materials in the slurry to 0.5 μm, thereby obtaining a pulverized slurry.

The pulverized slurry that was obtained was granulated and dried using a thermal spray dryer (spray dryer OC-16, manufactured by OHKAWARA KAKOHKI CO., LTD.). At this time, a rotary disk was used for spraying, thereby obtaining a granulated powder. The granulation and drying were carried out under conditions in which the number of revolutions was set to 24000 rpm, a slurry supply amount was set to 3 kg/hr, and a temperature was adjusted in such a manner that an outlet temperature of a drying column became 100° C.

A granulated powder that was obtained was calcinated using a stationary electric furnace in the air at 700° C. Continuously, a resultant calcinated powder was baked using a stationary electric furnace at 800° C. for 20 hours.

A baked aggregation that was obtained by the baking was put into a mortar and it was crushed with a pestle, an sieved sample classified with a sieve having a sieve aperture of 5 mm was crushed by a high speed rotary pulverizer (pin mill, manufactured by Makino mfg. Co., Ltd.) (crushing conditions: the number of revolutions was 10000 rpm), and then the resultant crushed sample was classified with a sieve having an aperture of 53 μm to collect a sieved lithium transition metal oxide powder (sample).

Chemical analysis was performed with respect to the collected lithium transition metal oxide powder (sample), and as a result thereof, $Li_{1.04}Ni_{0.52}Cu_{0.19}Mn_{0.25}O_2$ was found.

Example 4

As a dispersant, ammonium polycarboxylate (SN dispersant 5468, manufactured by SAN NOPCO LIMITED) was added to ion exchanged water in such a manner that the dispersant to a solid concentration of raw materials in slurry became 6% by weight, and the ammonium polycarboxylate was sufficiently dissolved and mixed in the ion exchanged water.

Lithium carbonate having D50 of 7 μm, electrolytic manganese dioxide having D50 of 23 μm and a specific surface area of 40 m$^2$/g, cobalt oxyhydroxide having D50 of 14 μm, and nickel hydroxide having D50 of 22 μm were weighed in a molar ratio of Li:Mn:Ni:Co=1.04:0.26:0.51:0.19, and the above-described metal salts were mixed and stirred in this order in the above-described ion exchanged water, in which the dispersant was dissolved in advance, to prepare slurry having a solid content concentration of 50% by weight. Next, the slurry was pulverized by a media stirring type pulverizer at 1300 rpm for 40 minutes to set the average particle size (D50) of the mixed raw materials in the slurry to 0.5 μm, thereby obtaining a pulverized slurry.

The pulverized slurry that was obtained was granulated and dried using a thermal spray dryer (spray dryer OC-16, manufactured by OHKAWARA KAKOHKI CO., LTD.), thereby obtaining a granulated powder. At this time, a rotary disk was used for spraying. The granulation and drying were carried out under conditions in which the number of revolutions was set to 24000 rpm, a slurry supply amount was set to 3 kg/hr, and a temperature was adjusted in such a manner that an outlet temperature of a drying column became 100° C.

A granulated powder that was obtained was calcinated using a stationary electric furnace in the air at 700° C. Continuously, a resultant calcinated powder was baked using a stationary electric furnace at 800° C. for 20 hours.

A baked aggregation that was obtained by the baking was put into a mortar and it was crushed with a pestle, and the resultant crushed sample was classified by using a sieve with an aperture of 53 μm to collect a sieved composite oxide powder (sample).

The collected sample was pulverized by using a classification mechanism-equipped collision type pulverizer (a counter jet mill "100AFG/50ATP", manufactured by Hosokawa Micron Corporation) under conditions in which the number of revolutions of a classifying rotor was set to 14900 rpm, a pulverizing air pressure was set to 0.6 MPa, three pulverizing nozzles having p of 2.5 were used, and a powder supply amount was set to 4.5 kg/h, thereby obtaining a lithium transition metal oxide powder (sample).

Chemical analysis was performed with respect to the obtained lithium transition metal oxide powder (sample), and as a result thereof, $Li_{1.04}Ni_{0.52}Cu_{0.19}Mn_{0.25}O_2$ was found.

<Comparative Example 1>

Lithium carbonate having average particle size (D50) of 8 μm, electrolytic manganese dioxide having the average particle size (D50) of 22 μm, nickel hydroxide having the average particle size (D50) of 25 μm, and cobalt oxyhydroxide having the average particle size (D50) of 14 μm were weighed in a molar ratio of Li: Mn:Ni:Co=1.06:0.31:0.31:0.32. Then, water was added to the metal salts that were weighed, and the resultant mixture was mixed and stirred to prepare slurry having a solid content concentration of 50% by weight.

As a dispersant, ammonium polycarboxylate (SN dispersant 5468, manufactured by SAN NOPCO LIMITED) was added to the obtained slurry (raw material content of 20 kg) in 6% by weight on the basis of the slurry solid content, the resultant mixture was pulverized by using a wet type pulverizer at 1300 rpm for 29 minutes to set the average particle size (D50) in the mixed raw materials in the slurry to 0.7 μm, thereby obtaining pulverized slurry.

The pulverized slurry that was obtained was granulated and dried using a thermal spray dryer (spray dryer OC-16, manufactured by OHKAWARA KAKOHKI CO., LTD.), thereby obtaining a granulated powder. At this time, a rotary disk was used for spraying. The granulation and drying were carried out under conditions in which the number of revolutions was set to 21000 rpm, a slurry supply amount was set to 24 kg/hr, and a temperature was adjusted in such a manner that an outlet temperature of a drying column became 100° C.

The obtained granulated powder was baked by using a stationary electric furnace in the air at 975° C. for 20 hours. The baked powder that was obtained by the baking was classified using a sieve having an aperture of 75 μm, and the classified powder was pulverized by using a classification mechanism-equipped collision type pulverizer (a counter jet mill "100AFG/50ATP", manufactured by Hosokawa Micron Corporation) under conditions in which the number of revolutions of a classifying rotor was set to 14900 rpm, a pulverizing air pressure was set to 0.6 MPa, three pulverizing nozzles having φ of 2.5 were used, and a powder supply amount was set to 4.5 kg/h, thereby obtaining a sample. Chemical analysis was performed with respect to the sample, and as a result thereof, a lithium transition metal oxide powder (sample) of $Li_{1.01}Ni_{0.330}Mn_{0.329}Co^{0.329}O_2$ was found.

<Measurement of Crystallite Size>

The crystallite size of the samples (powders) obtained in Examples and Comparative Examples was measured as follows by using a Rietveld method.

The Rietveld method is a method of refining crystal structure parameters from diffraction intensity obtained by a powder X-ray diffraction and the like. In the method, a crystal structure model is assumed, and then various parameters of the crystal structure are refined in such a manner that an X-ray diffraction pattern derived from the structure by calculation and an X-ray diffraction pattern that is actually measured are equal to each other as much as possible.

The crystallite size of the samples (powders), which were obtained in Examples and Comparative Examples, was measured by using an X-ray diffraction device (D8 ADVANCE, manufactured by Bruker AXS) using Cu-kα rays. At this time, analysis is performed by employing a fundamental parameter. The crystallite size was calculated by using analysis software Topas Version 3 on the basis of an X-ray diffraction pattern obtained from a diffraction angle (2θ) range of 15° to 120°.

On the assumption that the crystal structure belongs to a trigonal of space group R3-m, a 3a site is occupied by Li and Ni, a 3b site is occupied by Mn, Co, Ni, and excessive Li content x, and a 6c site is occupied by O, a site occupancy rate (Occ.) of oxygen was set as a variable, and all isotropic temperature factors (Beq.) were fixed to 1, and then refinement up to Rwp<5.0 and GOF<1.3 was performed.

In addition, the above-described Rwp and GOF are values that are obtained by the following Expression (refer to: "Hunmatsu X-sen Kaisekino Zissai (Actuals of Powder X-ray Analysis)", edited by Nippon Bunseki kagaku X-sen kennkyu Kondankai (Japan Analytical Chemistry X-ray Analysis Research Conversazione), published Feb. 10, 2002 by Asakura Publishing Co., Ltd., table 6.2 at p 107).

$$Rwp=[\Sigma_i wi\{yi-fi(x)^2\}/\Sigma_i wiyi^2]^{1/2}$$

$$Re=[(N-P)/\Sigma_i wiyi^2]^{1/2}$$

$$GOF=Rwp/Re$$

Provided that, wi represents a statical weight, yi represents measurement intensity, fi(x) represents theoretical diffraction intensity, N represents the number of total pieces of data, and P represents the number of refining parameters.

As a refinement sequence, the following operations of (1) to (3) were performed in a state in which a Z coordinate of oxygen and a site occupancy rate were set as variables.

(1) All isotropic temperature factors were fixed to 1.

(2) With regard to the 3a site, the Li site occupancy rate was set as a variable of 1-aa and the Ni site occupancy rate was set as a variable of aa, and with regard to the 3b site, the Ni site occupancy rate was set as γ-aa and the Li site occupancy rate was set as a variable of x+aa.

(3) With regard to the 3b site, the Co site occupancy rate was fixed to β and the Mn site occupancy rate was fixed to α.

The sequence of (1) to (3) was repeated until the respective variables did not vary.

In a state in which the crystallite size (Gauss) and a crystal strain (Gauss) were set as variables, refinement was repetitively performed until numerical values did not vary, thereby obtaining the crystallite size (Gauss).

The other device specifications and conditions that were used in the measurement and Rietveld method analysis are as follows.

Sample disp (mm): Refine
Detector: PSD
Detector Type: VANTEC-1
High Voltage: 5585 V
Discr. Lower Level: 0.25 V
Discr. Window Width: 0.15 V
Grid Lower Level: 0.075 V
Grid Window Width: 0.524 V
Flood Field Correction: Disabled
Primary radius: 250 mm
Secondary radius: 250 mm
Receiving slit width: 0.1436626 mm
Divergence angle: 0.3°
Filament Length: 12 mm
Sample Length: 25 mm
Receiving Slit Length: 12 mm
Primary Sollers: 2.623°
Secondary Sollers: 2.623°
Lorentzian, 1/Cos: 0.01630098 Th
Det. 1 voltage: 760.00 V
Det. 1 gain: 80.000000
Det. 1 discr. 1 LL: 0.690000
Det. 1 discr. 1 WW: 1.078000
Scan Mode Continuous Scan
Scan Type Locked Coupled
Spinner Speed: 15 rpm
Divergence Slit: 0.500°
Start: 15.000000
Time per step: 1 s
Increment: 0.01452
steps: 7152
Generator voltage: 40 kV
Generator current: 35 mA <Measurement of D50 after Pressing>

With regard to samples (powders) obtained in Examples and Comparative Examples, 3.00 g of each measurement sample (powder) was compressed at a pressure of 32 MPa by using a powder resistance measuring device (type MCP-PD51, manufactured by Mitsubishi Chemical Analytech Co., Ltd.), and then D50 of the measurement sample (powder) that was taken out was measured as follows.

The sample (powder) was put into an aqueous solvent by using a sample circulator ("Microtorac ASVR", manufactured by Nikkiso Co., Ltd.) for laser diffraction particle size distribution measurement, and ultrasonic waves of 40 watts were irradiated for 360 seconds at a flow velocity of 40 mL/sec. Then, a particle size distribution was measured by using a laser diffraction particle size distribution measuring device "HRA(X100)" manufactured by Nikkiso Co., Ltd., and D50 was obtained from a volumetric basis particle size distribution chart that was obtained.

In addition, as an aqueous solvent during measurement, water that was allowed to pass through a filter of 60 μm was used. A solvent refractive index was set to 1.33, a particle penetration condition was set to reflection, a measurement range was set to 0.122 μm to 704.0 μm, and a measurement time was set to 30 seconds. An average value obtained by performing measurement two times was set to D50.

<Measurement of Primary Particle Size>

A primary particle size of the samples (powders) obtained in Examples and Comparative Examples was measured as follows.

Each of the samples (powders) obtained in Examples and Comparative Examples was observed using a SEM (Scanning Electron Microscope) at a magnification of 5000 times, and 10 particles were randomly selected for one visual field to measure the length between grain boundaries. An average value of 10 values of the length was obtained as a primary particle size (μm).

<Measurement of Specific Surface Area (BET Method)>

A specific surface area of the samples (powders) obtained in Examples and Comparative Examples was measured as follows.

First, 0.5 g of each of the samples (powders) was weighed in a glass cell for a specific surface area measuring device MONOSORB LOOP ("MS-18", manufactured by YUASA IONICS INC.) according to a flowing type gas adsorption method, the inside of the glass cell was substituted with a nitrogen gas for five minutes at a gas flow rate of 30 mL/min using a pre-treatment device for MONOSORB LOOP, and then a heat treatment was performed in the nitrogen gas atmosphere at 250° C. for 10 minutes.

Then, the sample (powder) was measured by using the MONOSORB LOOP according to a BET one-point method.

In addition, as an adsorption gas during measurement, a mixed gas of 30% of nitrogen and 70% of helium was used.

<Evaluation of Battery Characteristics>

(Initial Discharge Capacity)

An initial discharge capacity was obtained by using an electrochemical cell that was prepared as described above according to the following method. That is, in a state of being constant-current and constant-potential charged at 20° C. with 0.1 C for 15 hours up to 4.3 V, a current value was calculated from the content of a positive electrode active material in a positive electrode to be 0.1C discharge rate. Discharge capacity (mAh/g) up to 3.0 V when being constant-current discharged was measured. In addition, evaluation of high-temperature characteristics was performed by the following method.

8.0 g of each of the lithium manganate powders (positive electrode active materials) obtained in Examples and Comparative Examples, 1.0 g of acetylene black (manufactured by DENKI KAGAKU KOGYO KABUSHIKI KAISHA), and 8.3 g of a solution obtained by dissolving 12% by weight of PVDF (manufactured by Kishida Chemical Co., Ltd.) in NMP (N-methylpyrrolidone) were accurately weighed and collected. In addition, 5 ml of NMP was added to the resultant mixture, and the mixture was sufficiently mixed to prepare paste. The paste placed on aluminum foil that was a current collector, and it was formed into a film using an applicator in which a gap was adjusted to 100 μm to 280 μm. Then, the film was vacuum-dried at 140° C. for a whole day and night. Then, the resultant laminated body was punched to ϕ of 16 mm and it was compressed at 4 t/cm² in a thickness direction. The resultant laminated body was set as a positive electrode. Immediately before manufacturing a battery, the positive electrode was vacuum-dried at 120° C. for 120 minutes or longer to remove adhered moisture, and it was assembled into the battery. In addition, an average value of the weight of the aluminum foil having φ of 16 mm was obtained in advance, and the weight of a positive electrode mixture was obtained by subtracting the weight of the aluminum foil from the weight of the positive electrode. In addition, the content of the positive electrode active material was obtained from a mixing ratio of the positive electrode active material, the acetylene black, and the PVDF.

Natural spherical graphite having φ of 17.5 mm (manufactured by PIONICS.CO.JP, electrode capacity: 1.6 mAh/cm$^2$) was used as a negative electrode, a ratio of negative electrode capacity/positive electrode capacity was adjusted to 1.15 to 1.20. With regard to an electrolytic solution, a solution, which was obtained by mixing EC and DMC in a volume ratio of 3:7 and by adding 0.5% of VC to the resultant mixture, was used as a solvent, and 1 mol/L of LiPF$_6$ as a solute was dissolved in the solvent, thereby preparing a cell TOMCEL (registered trademark) for electrochemical evaluation.

(Initial Activity Treatment)

A charge and discharge test was performed according to the following method by using the electrochemical cell prepared as described above, and an initial activity treatment was performed. The initial activity treatment is important for a lithium ion battery.

A preparation for charge and discharge was made by putting the cell in an environmental tester in which an environmental temperature during battery charge and discharge was set to 25° C. Then, the cell was left as is for one hour in order for a cell temperature to be the environmental temperature. A charge and discharge range was set to 3.0 V to 4.2 V. At a first cycle, 0.05 C constant-current and constant-voltage charge was performed, aging was performed for approximately 50 hours to 100 hours, and constant-current discharge was performed with 0.05 C. Then, two cycles of constant-current and constant-voltage charge with 0.1 C and constant-current discharge with 0.1 C were performed.

(Evaluation of High-Temperature Cycle Life: 60° C. High-Temperature Cycle Characteristic)

A charge and discharge test was performed according to the following method by using the electrochemical cell prepared as described above to evaluate high-temperature cycle life characteristics.

A preparation for charge and discharge was made by putting the cell in an environmental tester in which an environmental temperature during battery charge and discharge was set to 60° C. Then, the cell was left as is for four hours in order for a cell temperature to be the environmental temperature. A charge and discharge range was set to 3.0 V to 4.2 V. At a first cycle, charge was performed with 1.0 C constant-current and constant-potential and discharge was performed with 0.1 C constant-current. Then, 99 times of charge and discharge cycles with 1 C were performed at a charge and discharge depth of SOC 0% to 100%. At a 101$^{st}$ cycle, discharge was performed at a discharge rate of 0.1 C for confirmation of capacity.

The percentage (%) of a numerical value obtained by dividing discharge capacity at the 101$^{st}$ cycle by discharge capacity at the first cycle was obtained as a high-temperature cycle life characteristic value (0.1 C). In Table 1, high-temperature cycle life characteristic values are shown as an index (%) in a case of setting a high-temperature cycle life characteristic value (0.1 C) of Comparative Example 1 to 100 (%).

In addition, the percentage (%) of a numerical value obtained by dividing discharge capacity (1.0 C) at the 99$^{th}$ cycle by discharge capacity at the second cycle was obtained as a high-temperature cycle life characteristic value (1.0 C). In Table 1, high-temperature cycle life characteristic values are shown as an index (%) in a case of setting a high-temperature cycle life characteristic value (1.0 C) of Comparative Example 1 to 100 (%).

(Output Retention Rate before and after Cycle)

A charge and discharge test was performed by the following method by using the electrochemical cell that was subjected to the initial activity treatment, thereby obtaining an output retention rate.

The battery that was subjected to the initial activity treatment was placed in an environmental tester set to 25° C., charge was performed to reach SOC 50% from discharge capacity obtained by the initial activity treatment, and discharge was performed with 3.0 C for 10 seconds by using an electrochemical measuring device, thereby obtaining an initial output. The cell that was subjected to a cycle at a high temperature (60° C.) was set for an environmental test to be 25° C., charge was performed to reach SOC 50%, and discharge was performed with 3.0 C for 10 seconds by using an electrochemical measuring device, thereby obtaining an output after a cycle. A numerical value obtained by dividing the output after the high-temperature cycle by an initial output was obtained as "output retention rate (%)". In addition, in Table 1, output retention rates are shown as an index (%) in a case of setting an output retention rate (%) of Comparative Example 1 to 100 (%).

TABLE 1

|  | Example 1 | Example 2 | Example 3 | Example 4 | Comparative Example 1 |
|---|---|---|---|---|---|
| Specific surface Area | 2.4 m$^2$/g | 3.2 m$^2$/g | 3.5 m$^2$/g | 3.7 m$^2$/g | 1.8 m$^2$/g |
| Crystallite size | 46 nm | 53 nm | 63 nm | 70 nm | 356 nm |
| Average particle size of primary particles | 0.5 um | 0.4 um | 0.4 um | 0.4 um | 2.0 um |
| D50 after pressing | 4.8 μm | 14.9 μm | 6.4 μm | 2.0 μm | 2.3 μm |
| D50 after pressing/ crystallite size | 104 | 281 | 102 | 28.6 | 6.5 |
| Average particle size of primary particles/ crystallite size | 10.8 | 7.5 | 6.3 | 5.7 | 5.6 |
| <60° C. high-temperature cycle characteristic> | | | | | |
| Relative index of 0.1 C. discharge capacity retention rate (%) | 101 | 101 | 104 | 101 | 100 |

TABLE 1-continued

|  | Example 1 | Example 2 | Example 3 | Example 4 | Comparative Example 1 |
|---|---|---|---|---|---|
| Relative index of 1.0 C. discharge capacity retention rate (%) | 104 | 102 | 104 | 101 | 100 |
| <Output retention rate before and after cycle> | | | | | |
| Relative index of output characteristic (%) | 115 | 128 | 123 | 110 | 100 |

(Observation)

In a case of Examples 1 to 4, a lattice volume variation in response to a temperature variation is small, and a specific surface area of a powder is large. Accordingly, it is assumed that Li migration resistance in the vicinity of a surface during discharge is small due to an effect of an optimized specific surface area, and a discharge capacity retention rate after a cycle is high due to an effect of an optimized lattice volume variation rate.

According to results of a test performed by the present inventors in addition to the results of Examples 1 to 4, when the specific surface area is larger than 2.0 m$^2$/g and equal to or less than 5.0 m$^2$/g and the average particle size of the primary particles/crystallite size is 5.7 to 18.5, as is the case with Examples, it is considered that in a case of using the lithium metal composite oxide for a battery as a positive electrode active material, deterioration at a high temperature can be suppressed, and a discharge capacity retention rate, for example, at 60° C. can be improved.

In addition, when D50 after pressing/crystallite size of the lithium metal composite oxide is set to 50 to 500, it could be seen that a decrease in output characteristics of the battery can be further suppressed.

In addition, with regard to these effects, in a lithium metal composite oxide having a layered structure, which is expressed by General Formula of $Li_{1+x}(Mn_\alpha Co_\beta Ni_\gamma)_{1-x}O_2$ (0.00≤X≤0.07, 0.10≤α≤0.40, 0.10≤β≤0.40, and 0.30≤γ≤0.75), it can be considered that the same effects are exhibited.

The invention claimed is:

1. A positive electrode active material comprising a lithium metal composite oxide having a layered structure, which is expressed by General Formula of $Li_{1+x}(Mn_\alpha Co_\beta Ni_\gamma)_{1-x}O_2$ (0.00<X≤0.07, 0.10≤α≤0.40, 0.10≤β≤0.40, and 0.30≤γ≤0.75), wherein a specific surface area is more than 2.0 m$^2$/g and equal to or less than 4.0 m$^2$/g, wherein a ratio of an average particle size of primary particles of a powder of the lithium metal composite oxide to a crystallite size of a powder of the lithium metal composite oxide is 5.7 to 13.0, wherein a ratio of a pressed D50 of secondary agglomerated particles of a powder of the lithium metal composite oxide to a crystallite size of a powder of the lithium metal composite oxide is 25 to 500, wherein the pressed D50 of the secondary agglomerated particles is measured by adding N-methyl pyrrolidone to the lithium metal composite oxide to obtain a paste, drying the paste, compressing the dried paste at a pressure of 32 MPa by using a pressing machine, and measuring the D50 after pressing using a laser diffraction and scattering type particle size distribution measuring device, wherein the crystallite size is determined by measuring the crystallite size of a measurement sample (powder) by using an X-ray diffraction device using Cu-kα rays, at this time, analysis is performed by employing a fundamental parameter, and the crystallite size is calculated by using analysis software on the basis of an X-ray diffraction pattern obtained from a diffraction angle (2θ) range of 15° to 120°, and wherein the average particle size of the primary particles is determined by observing the average particle size of the primary particles by using a scanning electron microscope at an acceleration voltage of 20 kV and a magnification of 5000 times, and an image of the primary particles in an electron microscope photograph is analyzed using image analysis software to calculate the average particle size of the primary particles.

2. A lithium battery, comprising:
the positive electrode active material according to claim 1 as the positive electrode active material.

3. A lithium battery for a hybrid electric vehicle, comprising:
the positive electrode active material according to claim 1 as the positive electrode active material.

* * * * *